(12) United States Patent
Tian

(10) Patent No.: US 9,910,209 B2
(45) Date of Patent: Mar. 6, 2018

(54) BACKLIGHT MODULE, DISPLAY MODULE AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventor: Qing Tian, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 15/152,281

(22) Filed: May 11, 2016

(65) Prior Publication Data

US 2016/0341868 A1   Nov. 24, 2016

(30) Foreign Application Priority Data

May 22, 2015   (CN) .......................... 2015 1 0268470

(51) Int. Cl.
*F21V 7/04*   (2006.01)
*F21V 8/00*   (2006.01)

(52) U.S. Cl.
CPC ............ *G02B 6/005* (2013.01); *G02B 6/0053* (2013.01); *G02B 6/0055* (2013.01)

(58) Field of Classification Search
CPC .............................. G02B 6/005; G02B 6/0055
See application file for complete search history.

(56) References Cited

U.S. PATENT DOCUMENTS

2009/0101930 A1* 4/2009 Li .................. G02B 6/005
257/98

FOREIGN PATENT DOCUMENTS

| CN | 101292183 A | 10/2008 | |
| CN | 101346651 A | 1/2009 | |
| CN | 102027392 A | 4/2011 | |
| CN | 102112806 A | 6/2011 | |
| CN | 103104861 A | 5/2013 | |
| CN | 103672732 A | 3/2014 | |
| CN | 103988099 A | 8/2014 | |
| JP | 2006-119561 A | 5/2006 | |
| JP | 2015057162 * | 10/2017 | ............. H01L 33/50 |
| KR | 100989311 B1 | 10/2010 | |
| WO | WO2007055509 * | 5/2007 | ......... G02F 1/13357 |

OTHER PUBLICATIONS

First Chinese Office Action dated Nov. 2, 2016; Appln. No. 201510268470.0.
Second Chinese Office Action dated Apr. 12, 2017; Appln. No. 201510268470.0.

* cited by examiner

*Primary Examiner* — Donald Raleigh
(74) *Attorney, Agent, or Firm* — Ladas & Parry LLP

(57) ABSTRACT

A backlight module, a display module and a display device are disclosed. The backlight module includes a light guide plate (LGP); a light source disposed on a light incidence side of the LGP; and a photoluminescent layer disposed on a light-emitting surface of the LGP, the photoluminescent layer is made from phosphor materials, wherein a plurality of lens structures are disposed on one side of the photoluminescent layer facing away from the LGP. The display module includes a LCD and the backlight module. The display device includes the display module.

18 Claims, 2 Drawing Sheets

BACKLIGHT MODULE, DISPLAY MODULE AND DISPLAY DEVICE

TECHNICAL FIELD

At least one embodiment of the present invention relates to a backlight module, a display module and a display device.

BACKGROUND

With the development of the thin-film transistor liquid crystal display (TFT-LCD) technology and the technological advance of industry as well as the reduced manufacturing cost of liquid crystal displays (LCDs) and the increasingly improved manufacturing process, LCD technology has displaced the cathode ray tube (CRT) display technology to become mainstream in the current display field, and hence LCD has become an ideal display device for both the market and the consumers attributed to the advantages thereof.

LCD panel per se is a non-luminous passive display device and can only achieve the display function via a backlight module. As illustrated in FIG. I, the backlight module generally includes a light guide plate (LGP) and a light source disposed on a light incidence side of the LGP. Currently, the backlight module mainly includes electroluminescence (EL) film, cold cathode fluorescent lamp (CCFL) and light-emitting diode (LED), and can be categorized into edge-lit type and direct-lit type according to the distribution position of the light source, in which the LED backlight module has currently become mainstream trend in the development of backlight modules for advantages such as energy saving and environmental protection, long service life, small size and wide color gamut.

With the development of the backlight technology, the blue LED with high light energy has begun to be used as a light source. When the blue LED serves as the light source, the blue light is usually converted into white light by the combination of a blue-light chip and yellow fluorescent powders and then is supplied to a display panel. However, such method generally has problems such as low color rendering index (CRI), narrow spectrum as formed and absence of red light component in the spectrum, which results in that the display panel has the phenomenon of chromatic aberration. In addition, when the blue LED is used as the light source, the brightness of the light source always cannot achieve the ideal state, so an intensifier needs to be disposed between the LGP and the display panel to increase the brightness of the display panel; however, the intensifier is relatively expensive, so the method of improving the brightness via the intensifier will increase the manufacturing cost of the backlight module.

SUMMARY

Embodiments of the present invention provide a backlight module, a display module and a display device which can solve the problems of large chromatic aberration and low brightness in the conventional display technology in which a blue LED light source and a fluorescent photoluminescent layer are combined.

Embodiments of the present invention utilize technical solutions as below.

The backlight module as provided by embodiments of the present invention includes: a light guide plate (LGP); a light source disposed on a light incidence side of the LGP; and a photoluminescent layer disposed on a light-emitting surface of the LGP, the photoluminescent layer is made from phosphor materials, wherein a plurality of lens structures are disposed on one side of the photoluminescent layer facing away from the LGP.

The display module as provided by embodiments of the present invention includes a liquid crystal display (LCD) panel and the backlight module as provided by embodiments of the present invention.

The display device as provided by embodiments of the present invention includes the display module as provided by embodiments of the present invention.

BRIEF DESCRIPTION OF THE DRAWINGS

In order to clearly illustrate the technical solution of the embodiments of the present invention, the drawings of the embodiments will be briefly described in the following, wherein.

DETAILED DESCRIPTION

In order to make objects, technical solutions and advantages of the embodiments of the present invention apparent, the technical solutions of the embodiment will be described in a clearly and fully understandable way in connection with the drawings related to the embodiments of the present invention. It is obvious that the described embodiments are just a part but not all of the embodiments of the present invention. Based on the described embodiments herein, those skilled in the art can obtain other embodiment(s), without any inventive work, which should be within the scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Figure 1:
FIG. 1 is a schematically structural view of a conventional backlight module.
Figure 2:
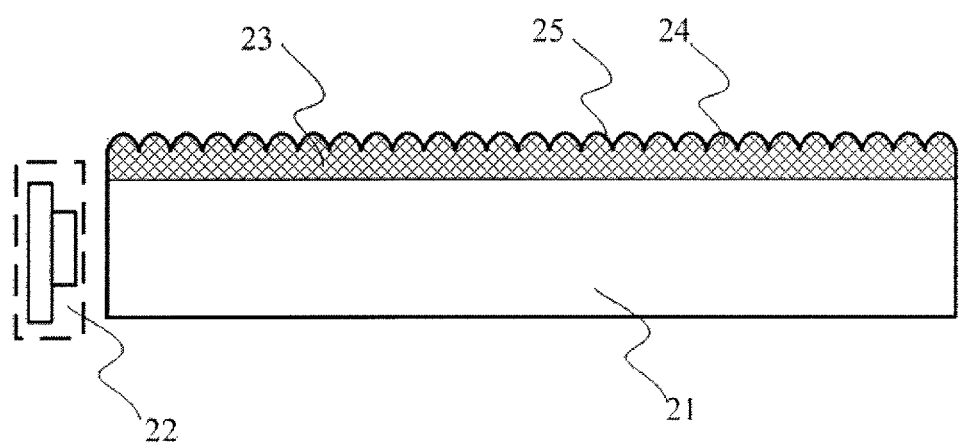
FIG. 2 is a schematically structural view of a backlight module provided by an embodiment of the present invention.

FIG. 2 illustrates a backlight module provided by an embodiment of the present invention. As seen from FIG. 2, the backlight module includes an LGP 21; a light source 22 disposed on a light incidence side of the LGP; and a photoluminescent layer 23 disposed on a light-emitting surface of the LGP, the photoluminescent layer 23 is made from phosphor materials, wherein a plurality of lens structures 24 are disposed on one side of the photoluminescent layer 23 facing away from the LGP 21.

In one example, the light source 22 is a blue LED. Compared with a white LED, the blue LED has higher energy.

In one example, the LGP is a flat LGP or a wedge LGP, wherein the wedge LGP particularly can optimize the optical design, increase the light utilization efficiency and improve the brightness and uniformity of the backlight module.

In one example, the lens structure 24 and the photoluminescent layer 23 are made from the same materials.

In one example, the process of forming the photoluminescent layer 23 mainly includes: uniformly applying phosphor materials onto a light-emitting surface of the LGP 21 by coating methods to form a phosphor material layer.

In one example, the process of forming the lens structures 24 mainly includes: forming the plurality of lens structures 24 on one side of the phosphor material layer facing away from the LGP by low-temperature heating and extruding the phosphor material layer.

In the prior art, it usually utilizes fluorescent materials to form the photoluminescent layer; as a comparison, phosphor materials utilized in the embodiment of the present invention are generally various transition compounds or rare earth metal compounds. The emission of the fluorescent materials is the result of converting excitons from excited singlet state to ground state, while the emission of the phosphor materials is the result of converting excitons from excited triplet state to ground state. According to the quantum-statistical theory of spin, the ratio of the probability to produce singlet excitons to the probability to produce triplet excitons after the recombination of electrons and holes is 1:3. That is to say, the excitons in singlet state only occupy 25% of electron-hole pairs, and the other 75% electron-hole pairs form spin-forbidden triplet excitons and hence are not conducive to fluorescence radiation. Therefore, in the prior art of forming the photoluminescent layer by the fluorescent materials, the maximum conversion of converting blue light to white light is only 25% of the light source; but the phosphor materials can be subjected to a transition through the excitons at triplet state, so that the light produced in the process of converting the excitons from the singlet state to the ground state and the light produced in the process of converting the excitons from the triplet state to the ground state are mixed to produce exciting light with relatively wider spectrum, and meanwhile, the light conversion rate is improved.

In one example, one side of the LGP 21 facing a display substrate matched with the LGP is a light-emitting surface of the LGP, while one side of the LGP 21 opposite to the light source is a light incidence surface of the LGP 21. Upon entering the LGP 21 from the light incidence surface, the light emitted by the light source 22 is refracted and reflected in the LGP 21 and emitted from the light-emitting surface, so as to provide light source for the display panel.

As described above, in the backlight module provided by the embodiment of the present invention, the photoluminescent layer made from the phosphor materials is disposed on the light-emitting surface of the LGP. Because the phosphor materials can be more uniformly coated as compared with the conventionally used fluorescent materials, the photoluminescent layer made from the phosphor materials is advantageous for enhancing the uniform distribution of light. Meanwhile, because the exciting light produced from the excitation of the phosphor materials has wider spectrum as compared with the conventionally used fluorescent materials, the problem of chromatic aberration in the conventional display technology in which the blue LED light source and the fluorescent photoluminescent layer are combined can be effectively solved. Moreover, because the plurality of lens structures are formed on one side of the photoluminescent layer facing away from the LGP, the intensity of light is enhanced upon the light passing through the lens structures, and meanwhile, the light loss due to the requirement of passing through a plurality of layers of optical films can be avoided. Therefore, the lens structure not only can effectively improve the display brightness and meet the product demands but also can reduce the manufacturing cost. Thus, the backlight module comprising the above-mentioned photoluminescent layer and lens structures also has the same advantages.

Figure 3:
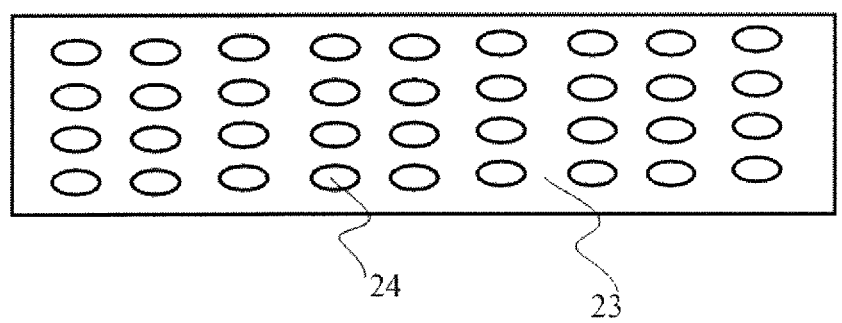
FIG. 3 is a schematically structural top view of a photoluminescent layer in the backlight module provided by an embodiment of the present invention, in which a light-emitting surface of a lens structure is a semi-ellipsoidal surface.
Figure 4:
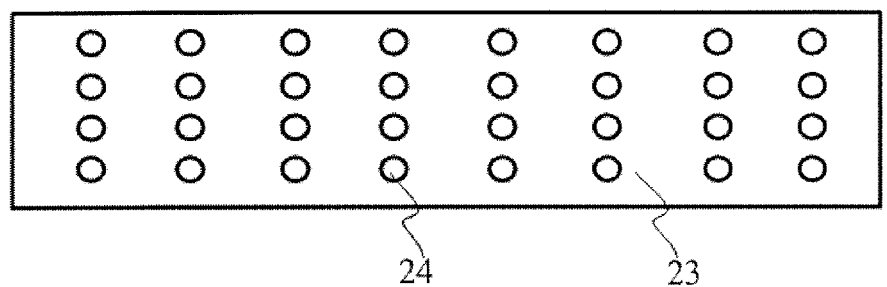
FIG. 4 is a schematically structural top view of a photoluminescent layer in the backlight module provided by an embodiment of the present invention, in which a light-emitting surface of a lens structure is a hemispherical surface.

In one example, in order to improve the display brightness, a convex surface of the lens structure 24 is a light-emitting surface 25 which is a hemispherical surface or a semi-ellipsoidal surface. Referring to FIGS. 3 and 4, FIG. 3 is a schematically structural top view of an example photoluminescent layer in which the light-emitting surface of the lens structure is a semi-ellipsoidal surface, and FIG. 4 is a schematically structural top view of an example photoluminescent layer in which the light-emitting surface of the lens structure is a hemispherical surface. In the example, due to the difference of the refractive index, when the light emitted by the light source is diffused and emitted through the lens structures of which the light-emitting surfaces are hemispherical or semi-ellipsoidal surfaces, the viewing angle can be increased, so that more uniform brightness distribution of the backlight can be achieved, and hence the display brightness can be improved.

In one example, the diameter of the lens structure 24 is 0.08 to 0.12 mm. In the example, as the diameter of the lens structures is 0.08 to 0.12 mm, not only blue light emitted by the light source can be fully converted into white light but also the light transmittance cannot be affected by excessively thick lens structures due to overlarge diameter of the lens structures.

In one example, the lens structures 24 are arranged in an array, namely uniformly distributed in the row direction and the column direction. In the example, as the lens structures are uniformly distributed in the row direction and the column direction, the uniform distribution of light can be further enhanced, so that more uniform brightness distribution of the backlight can be achieved, and hence the display quality of the panel can be improved.

In one example, in order to further improve the uniformity of brightness distribution, the spacing of the lens structures 24 in the row direction is equal to the spacing of the lens structures in the column direction. That is to say, the spacing of two adjacent lens structures in the row direction is equal to the spacing of two adjacent lens structures in the column direction, wherein the spacing of the two adjacent lens structures may be defined as the distance between central axes of two lenses.

Figure 5:
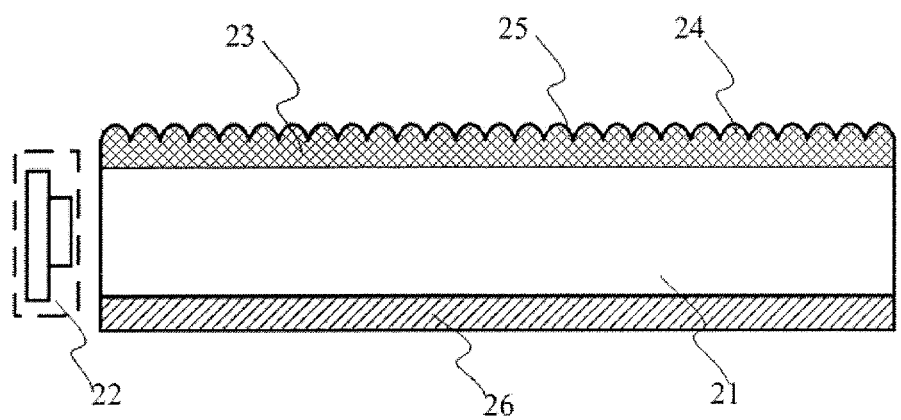
FIG. 5 is a schematically structural view of a backlight module provided by another embodiment of the present invention.

FIG. 5 illustrates a backlight module provided by another embodiment of the present invention. As seen from FIG. 5, the structure of the backlight module provided by the present embodiment is basically the same with that of the foregoing embodiment, except that the present embodiment further includes a reflector 26 disposed beneath the LGP 21.

In the embodiment, the backlight module further includes the reflector disposed beneath the LGP. Light emitted from a surface opposite to the light-emitting surface can be reflected into the LGP through the reflector, so that the utilization efficiency of the light source can be improved, and meanwhile, the display brightness can be improved.

The arrangement of components in the backlight module such as the LGP, the light source, the photoluminescent layer in the embodiment may refer to corresponding description in the foregoing embodiment. No further description will be given herein.

Based on the same invention concept, the embodiment of the present invention further provides a display module, which includes an LCD panel and any of the foregoing backlight modules.

Based on the same invention concept, the embodiment of the present invention further provides a display device, which includes the above-mentioned display module.

In summary, embodiments of the present invention provide a backlight module, a display module and a display device, wherein the backlight module includes a LGP, a light source disposed on a light incidence side of the LGP, and a photoluminescent layer disposed on the light-emitting surface of the LGP, wherein the photoluminescent layer is made from the phosphor materials. Because the phosphor materials can be more uniformly coated as compared with the conventionally used fluorescent materials, the photoluminescent layer made from the phosphor materials is advantageous for enhancing the uniform distribution of light. Meanwhile, because the exciting light produced from the excitation of the phosphor materials has wider spectrum as compared with the conventionally used fluorescent materials, the photoluminescent layer made from the phosphor materials can also effectively solve the problem of chromatic aberration in the conventional display technology in which the blue LED light source and the fluorescent photoluminescent layer are combined, and improve the luminescent properties of the backlight module. Moreover, because the plurality of lens structures are formed on one side of the photoluminescent layer facing away from the LGP, the intensity of light is enhanced after the light passing through the lens structures, and meanwhile, the light loss due to the requirement of passing through a plurality of layers of optical films can be avoided. Therefore, the lens structure not only can effectively improve the display brightness and meet the product demands but also can reduce the manufacturing cost. Thus, the backlight module, the display module and the display device comprising the photoluminescent layer and the lens structures also have the same advantages.

The foregoing embodiments are merely used for explaining the technical solution of the present invention, and not intended to limit the present invention; although the present invention is explained in detail with reference to the foregoing embodiments, those of ordinary skill in the art will readily appreciate that many modifications are possible in the foregoing embodiments, or equivalent substitutions are made for part of technical features; however, these modifications or substitutions are not intended to make the essences of the corresponding technical solutions depart from the spirit and the scope of the technical solutions of the embodiments of the present invention.

The present application claims priority of Chinese Patent Application No. 201510268470.0 filed on May 22, 2015 titled "BACKLIGHT MODULE, DISPLAY MODULE AND DISPLAY DEVICE", the disclosure of which is incorporated herein by reference in its entirety as part of the present application.

What is claimed is:

1. A backlight module, comprising:
   a light guide plate (LGP);
   a light source disposed on a light incidence side of the LGP; and
   a photoluminescent layer disposed on a light-emitting surface of the LGP, and the photoluminescent layer is made from phosphor materials, wherein
   a plurality of lens structures are disposed on one side of the photoluminescent layer facing away from the LGP, wherein the diameter of the lens structures is 0.08 mm to 0.12 mm.

2. The backlight module according to claim 1, wherein a raised surface of the lens structure serves as the light-emitting surface which is a hemispherical surface or a semi-ellipsoidal surface.

3. The backlight module according to claim 1, wherein the lens structures are distributed in an array.

4. The backlight module according to claim 3, wherein the lens structures have the same spacing on rows and columns of the array.

5. The backlight module according to claim 1, further comprising a reflector disposed beneath the LGP.

6. The backlight module according to claim 1, wherein the LGP is a flat LGP or a wedge LGP.

7. The backlight module according to claim 1, wherein the lens structure is made from phosphor materials.

8. A display module, comprising a liquid crystal display (LCD) panel and a backlight module, wherein the backlight module comprises:
   an LGP;
   a light source disposed on a light incidence side of the LGP; and
   a photoluminescent layer disposed on a light-emitting surface of the LGP, and the photoluminescent layer is made from phosphor materials, in which
   a plurality of lens structures are disposed on one side of the photoluminescent layer facing away from the LGP, wherein the diameter of the lens structures is 0.08 mm to 0.12 mm.

9. The display module according to claim 8, wherein a raised surface of the lens structure serves as the light-emitting surface which is a hemispherical surface or a semi-ellipsoidal surface.

10. The display module according to claim 8, wherein the lens structures are distributed in an array.

11. The display module according to claim 10, wherein the lens structures have same spacing on rows and columns of the array.

12. The display module according to claim 8, further comprising a reflector disposed beneath the LGP.

13. The display module according to claim 8, wherein the LGP is a flat LGP or a wedge LGP.

14. The display module according to claim 8, wherein the lens structure is made from phosphor materials.

15. A display device, comprising a display module, the display module comprises a LCD panel and a backlight module, wherein the backlight module comprises:
   an LGP;
   a light source disposed on a light incidence side of the LGP; and
   a photoluminescent layer disposed on a light-emitting surface of the LGP, and the photoluminescent layer is made from phosphor materials, in which a plurality of lens structures are disposed on one side of the photoluminescent layer facing away from the LGP, wherein the diameter of the lens structures is 0.08 mm to 0.12 mm.

16. The display device according to claim 15, wherein a raised surface of the lens structure is a light-emitting surface which is a hemispherical surface or a semi-ellipsoidal surface.

17. The display device according to claim 15, wherein the lens structures are distributed in an array.

18. The display device according to claim 15, further comprising a reflector disposed beneath the LGP.

* * * * *